Feb. 19, 1957 L. H. MORIN 2,781,548
CORES AND DIES FOR PRODUCING HOLLOW BODIES
Filed June 22, 1953
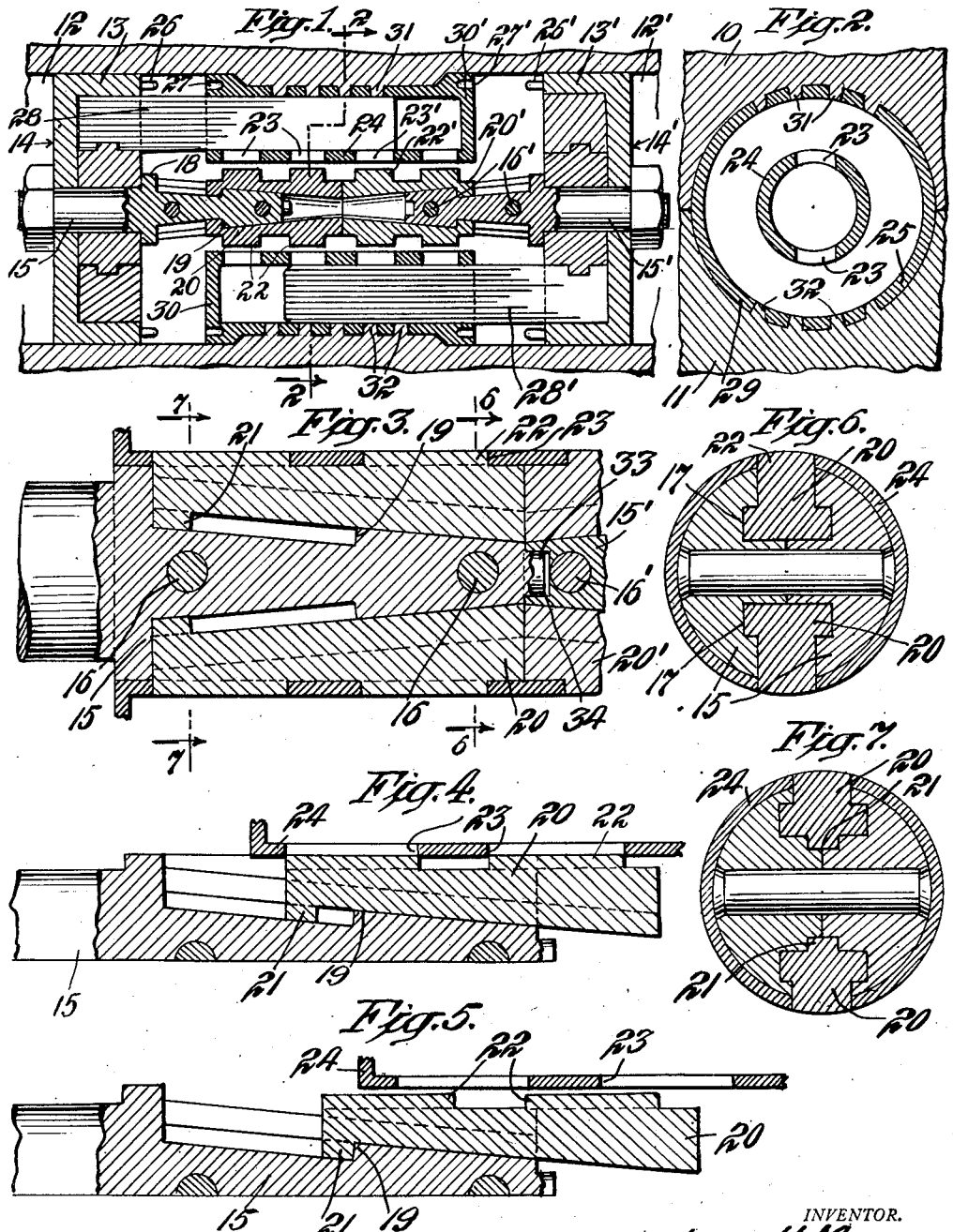
INVENTOR.
LOUIS H. MORIN
BY Howard E. Thompson
ATTORNEY

United States Patent Office 2,781,548
Patented Feb. 19, 1957

2,781,548

CORES AND DIES FOR PRODUCING HOLLOW BODIES

Louis H. Morin, Bronx, N. Y., assignor to Coats & Clark, Inc., New York, N. Y., a corporation of Delaware Application June 22, 1953, Serial No. 363,310

10 Claims. (Cl. 18—42)

This invention relates to the molding of hollow bodies such as thread spools. More particularly, the invention deals with a novel core structure for forming openings in longitudinal walls of the hollow body to materially reduce the weight of the body, while at the same time maintaining the strength thereof.

Still more particularly, the invention deals in a mold and core structure wherein part of the coring is formed in the mold or die halves in forming openings in outer walls of the hollow body.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a longitudinal sectional view through a mold and core structure made according to my invention, showing the parts in a partially open position and illustrating the method of use, parts of the construction being shown in elevation and part of the background being omitted;

Fig. 2 is a section on the line 2—2 of Fig. 1 showing only the mold and the molded product within the mold;

Fig. 3 is a view similar to Fig. 1 showing only a part of the core structure, with the parts in a closed position;

Fig. 4 is a view similar to Fig. 3 showing the parts of the core in a partially open position, and showing only part of the construction;

Fig. 5 is a view similar to Fig. 4 showing the core parts in fully open position;

Fig. 6 is a section on the line 6—6 of Fig. 3; and

Fig. 7 is a section on the line 7—7 of Fig. 3.

In Figs. 1 and 2 of the drawing, I have shown at 10 and 11 two die or mold members. These members, when in closed position, form at opposed ends thereof cylinders 12, 12' in which piston heads or head portions 13, 13' of two similar core units 14, 14' operate.

The units 14, 14' have core mandrels 15, 15' which are divided centrally and longitudinally, and secured together by rivet pins 16, 16'. In order to clarify the showing, the halves of the mandrels are shown in cross section in Figs. 1, 3, 4 and 5. In other words, the cross sections in these views will be slightly off the vertical center of the showings, as for example in Figs. 6 and 7. This has been done simply to clearly illustrate the parts.

As the structure of both mandrels 15, 15' is the same, the mandrel 15 alone will be specifically described, and it will be understood that its description is applicable to the mandrel 15'.

In joining the mandrel halves or sections dovetailed grooves 17 are formed between upper and lower surfaces as shown in the drawing, these grooves being tapered from the outer collar end 18 inwardly to the stop shoulder 19. Operating in the grooves 17 are opposed mandrel elements 20 of a cross sectional form to fit and operate in the grooves 17, as is clearly shown in Fig. 6, the mandrel elements having at their outer ends extending tongues 21, note Fig. 7, which are adapted to strike the stop shoulders 19 in checking opening movement of the elements, and in retaining the elements against longitudinal displacement from the mandrel 15.

The elements 20 have longitudinally spaced core or projecting members 22 which are adapted to form longitudinal openings 23 in opposed walls of the inner tube 24 of the molded spool 25, as will clearly appear from a consideration of Fig. 2 of the drawing. The elements 20' of the mandrel 15' has similar projecting members 22' for forming other apertures 23' in the tube 24, as will appear from a consideration of Fig. 1 of the drawing. In this figure, the members 22' are shown in longitudinal alinement with the members 22. It will be apparent, however, that the members 22' can be positioned at right angles to the members 22 by simply fixing the position of the mandrel 15' in the piston head 13'. The common alinement has been shown as it simplifies the disclosure in the application.

It will appear from a consideration of Fig. 1 of the drawing that the piston heads 13, 13' have circumferentially spaced projections 26, 26' for forming apertures 27, 27' in end walls of the spool body. The heads also support circumferentially spaced, longitudinal core elements 28, 28', which are movable with units 14, 14', respectively and which define the contour of the spool between the inner tube 24 and the outer tube 29 thereof. However as this particular structure per se is not the subject of the present invention, no specific showing is made thereof, the structure being described and claimed in copending application Ser. No. 363,364, filed June 22, 1953. It will be understood, however, that the elements 28' interfit with the elements 28, as disclosed in said copending application, and aid in controlling the formation of the spool end walls, part of which are shown at 30, 30' in Fig. 1 of the drawing.

It is also preferred that the dies or molds 10 and 11 each have pins 31, 32 spaced circumferentially as well as longitudinally thereof, and so formed as to free themselves from the resulting apertures which are formed in the outer tube 29 of the spool body 25. As clearly noted in Fig. 3 of the drawing, the inner end of the mandrel 15 has an alinement pin 33 fitting a corresponding socket 34 in the mandrel 15' for alinement of the mandrels, one with respect to the other, when in closed position.

In Fig. 3 of the drawing, the two mandrels, as well as the mandrel elements 20, 20', are shown in the fully closed position in which position the spool body 25 is molded around the core elements and within the cavity of the dies or molds 10 and 11. After the spool body 25 has been molded, the piston heads 13, 13' are moved outwardly by suitable means, not shown, and in the first stages of this operation the elements 20, 20' are disengaged from the inner tube 24, as noted in Fig. 4 of the drawing, after which the tongues 21 will strke the shoulders 19, the elements 20 being then in spaced relation to the bore of the inner tube 24, as seen in Figs. 1 and 5, whereupon continued movement of the pistons 13, 13' will operate to completely withdraw the elements 20, 20' from the molded spool 25, as well as the core elements 28, 28' therefrom, after which the molds 10 and 11 are separated and the molded spool 25 is removed from the molds, whereupon the parts are again brought into the closed position shown in Fig. 3 and another molded spool body formed.

From the foregoing, it will be apparent that I provide a core structure comprising longitudinally, as well as radially, movable projecting members for forming longitudinal and circumferentially spaced apertures in the inner tube 24 of a molded spool of the kind under consideration. This structure, together with the formation of the apertures in the outer tube 29 of the spool, as well as the apertures 27, 27' in the end walls of the spool, produces in a cored spool body an extremely lightweight structure. This is important, not only from the standpoint of saving material and thus minimizing the cost of the spool, but also in the weight saving factor in the shipment and transportation of spools, particularly when shipped in bulk. It will be apparent that a relatively large number of hollow molded spools would be equal to the weight of a single turned wood spool as commonly used in the merchandising of thread under known processes.

By making the mandrels 15, 15' of separate halves, the formation of these mandrels is materially simplified, as is also the assemblage of the parts, the dovetailed construction serving to definitely unite the mandrel elements with the mandrel sections, as will be apparent.

Having fully described my invention, what I claim as new and desire to secure by Letters Patent is:

1. A core and die structure for producing a hollow body characterized by having an inner tubular member, said structure comprising a pair of dies, a pair of core units movably supported in the dies and forming in conjunction with said dies a mold cavity defining the hollow body to be formed, said core units having circumferentially spaced interfitting core elements defining a portion of the internal construction of said body including outer surfaces of the tubular member, the core units having axially alined mandrels having inwardly bevelled surfaces, mandrel elements movably mounted on and keyed to the bevelled surfaces of said mandrels, said mandrel elements in one position on said mandrel forming the bore of said tubular member and having longitudinally and circumferentially spaced outwardly extending core members for forming apertures in the tubular member, said mandrel elements being withdrawable from the tubular member during movement of the core units from the hollow body formed within said cavity.

2. A core and die structure according to claim 1 in which said mandrels and mandrel elements have interengaging means for checking relative movement therebetween in both directions.

3. A core structure for forming hollow spool bodies defined by spaced inner and outer tubes integrally joined through circumferentially spaced end wall portions, said core structure comprising two core units, each unit having circumferentially spaced core elements interfitting with those of the other unit and helping to define said inner and outer tubes and circumferentially spaced end wall portions, each unit having a mandrel for forming the bore of said inner tube, said mandrel having inwardly tapered surfaces and having mandrel elements slidably engaging said tapered surfaces, said mandrel elements being movable radially to form apertures in said inner tube, means for keying the mandrel elements against displacement from said mandrels, and means for checking movement of the mandrel elements in both directions on said mandrels.

4. A die and core structure for producing a light weight plastic thread spool having an inner tube, an outer barrel, end walls joining the tube and barrel, and flanged rims at each end, said structure comprising a pair of relatively movable dies having mating cavities which define outer sides of the spool barrel, each die having a group of longitudinally and transversely spaced pins extending from a surface defining the cavity thereof, said pins serving to form weight-reducing plastic-saving openings in the spool barrel; a pair of core units movable toward and from said mating cavities and adapted to engage each other to define end faces of the spool as well as internal construction of the spool as hereinafter described, each core unit comprising an outer head portion, a plurality of longitudinal core elements extending from said head portion and spaced circumferentially thereof, and a central mandrel portion extending from the head portion and disposed inwardly of said core elements; each said head portion defining the outer surface of an end wall of the spool and having a series of circumferentially spaced projections outwardly of said core elements adapted to form weight-reducing plastic-saving openings in said end wall at the flanged rim thereof; said core elements of one unit interfitting with those of the other unit and being disposable between the tube and barrel of the spool, said interfitting core elements defining inner surfaces of the barrel and end walls and outer surfaces of the tube; said mandrel portions being adapted to engage each other to define inner surfaces of the tube, each mandrel portion comprising two longitudinal inwardly tapered, oppositely disposed sections and two longitudinally outwardly tapered, oppositely disposed mandrel elements interfitting with said sections by means of male and female dovetails, said mandrel elements having longitudinally and transversely spaced projecting members on the outer surfaces thereof for forming weight-reducing plastic-saving openings in said tube, said sections being movable relatively to the mandrel elements to enable the latter to be withdrawn from the cast tube, and interengaging means on the sections and mandrel elements for moving the latter outwardly from the spool.

5. A die and core structure for producing a plastic thread spool having an inner tube, an outer barrel, and end walls joining the tube and barrel, said structure comprising a pair of relatively movable dies having mating cavities which define outer sides of the spool barrel; a pair of core units movable toward and from said mating cavities and adapted to engage each other to define end faces of the spool as well as internal construction of the spool as hereinafter described, each core unit comprising an outer head portion, a plurality of longitudinal core elements extending from said head portion and spaced circumferentially thereof, and a central mandrel portion extending from the head portion and disposed inwardly of said core elements; each said head portion defining the outer surface of an end wall of the spool; said core elements of one unit interfitting with those of the other unit and being disposable between the tube and barrel of the spool, said interfitting core elements defining inner surfaces of the barrel and end walls and outer surfaces of the tube; said mandrel portions being adapted to abut each other to define inner surfaces of the tube, each mandrel portion comprising a plurality of longitudinally inwardly tapered sections and a plurality of longitudinal outwardly tapered mandrel elements slidably engaged with said sections, said mandrel elements having longitudinally and transversely spaced projecting members on the outer surfaces thereof for forming weight-reducing plastic-saving openings in said tube, said sections being movable relatively to the mandrel elements to enable the latter to be withdrawn from the cast tube, and interengaging means on the sections and mandrel elements for moving the latter outwardly from the spool.

6. A die and core structure for producing a spool having an inner tube, an outer barrel, and end walls joining the tube and barrel, said structure comprising a pair of relatively movable dies having mating cavities which define outer sides of the spool barrel; a pair of core units movable toward and from said mating cavities and adapted to engage each other to define end faces of the spool as well as internal construction of the spool as hereinafter described, each core unit comprising an outer head portion, a plurality of longitudinal core elements extending from said head portion and spaced circumferentially thereof, and a central mandrel portion extending from the head portion and disposed inwardly of said core elements; each said head portion defining the outer surface of an end wall of the spool; said core elements of one unit interfitting with those of the other unit and being disposable between the tube and barrel of the spool, said interfitting core elements defining inner surfaces of the barrel and end walls and outer surfaces of the tube; said mandrel portions being adapted to abut each other to define inner surfaces of the tube, each mandrel portion comprising at least one section and at least one mandrel element movably engaged with said section, and said mandrel element being movable toward and from said tube and having a plurality of spaced projecting members on the outer surface thereof for forming weight-reducing openings in said tube.

7. A core structure for use with a pair of spool-forming dies for producing a plastic thread spool, said spool having an inner tube, an outer barrel, end walls joining the tube and barrel, and flanged rims at each end, said structure comprising a pair of core units movable toward and from said dies and adapted to engage each other to define end faces of the spool as well as internal construction of the spool as hereinafter described, each core unit comprising an outer head portion, a plurality of longitudinal core elements extending from said head portion and spaced circumferentially thereof, and a central mandrel portion extending from the head portion and disposed inwardly of said core elements; each said head portion defining the outer surface of an end wall of the spool and having a series of circumferentially spaced projections outwardly of said core elements adapted to form weight-reducing plastic-saving openings in said end wall at the flanged rim thereof; said core elements of one unit interfitting with those of the other unit and being disposable between the tube and barrel of the spool, said interfitting core elements defining inner surfaces of the barrel and end walls and outer surfaces of the tube; said mandrel portions being adapted to abut each other to define inner surfaces of the tube, each mandrel portion comprising two longitudinal inwardly tapered sections and two longitudinal outwardly tapered mandrel elements interfitting with said sections by means of male and female dovetails, said mandrel elements having longitudinally and transversely spaced projecting members on the outer surfaces thereof for forming weight-reducing plastic-saving openings in said inner tube, said sections being movable relatively to the mandrel elements to enable the latter to be withdrawn from the cast tube, and interengaging means on the sections and mandrel elements for moving the latter outwardly from the spool.

8. A core structure for use in making a plastic thread spool characterized by having an inner tube, said structure comprising a pair of movable core units adapted to engage each other to define ends of the spool as well as internal construction of the spool as hereinafter described, each core unit comprising an outer head portion, a plurality of longitudinal core elements extending from said head portion and spaced circumferentially thereof, and a central mandrel portion extending from the head portion and disposed inwardly of said core elements; each said head portion defining the outer surface of an end of the spool; said core elements of one unit interfitting with those of the other unit and said interfitting core elements defining inner surfaces of the ends and outer surfaces of the tube; said mandrel portions being adapted to abut each other to define inner surfaces of the tube, each mandrel portion comprising a plurality of inwardly tapered sections and a plurality of outwardly tapered mandrel elements slidably engaged with said sections, said mandrel elements having longitudinally and transversely spaced projecting members on the outer surfaces thereof for forming weight-reducing plastic-saving openings in said inner tube, said sections being movable relatively to the mandrel elements to enable the latter to be withdrawn from the cast tube, and interengaging means on the sections and mandrel elements for moving the latter outwardly from the spool.

9. A core structure for use in making a spool characterized by having an inner tube, said structure comprising a pair of movable core units adapted to engage each other to define portions of the spool, each core unit having a central mandrel portion and a plurality of core elements spaced circumferentially around said mandrel portion; said core elements of one unit interfitting with those of the other unit and said interfitting core elements defining outer surfaces of the tube; said mandrel portions being adapted to abut each other to define inner surfaces of the tube, each mandrel portion comprising at least one section and at least one mandrel element movably engaged with said section, said mandrel element being movable toward and from said tube and having a plurality of spaced projecting members on the outer surfaces thereof for forming weight-reducing openings in said tube.

10. A core structure for use in making a spool characterized by having an inner tube, said structure comprising a pair of movable core units adapted to engage each other to define portions of the spool, each core unit having a central mandrel portion adapted to abut the mandrel portion of the other core unit to define inner surfaces of the tube, each mandrel portion comprising at least one section and at least one mandrel element movably engaged with said section, said mandrel element being movable toward and from said tube and having a plurality of spaced projecting members on the outer surfaces thereof for forming weight-reducing openings in said tube.

References Cited in the file of this patent
UNITED STATES PATENTS

| Number | Name | Date |
|---|---|---|
| 180,169 | Tasker | July 25, 1876 |
| 500,682 | Vallee et al. | July 4, 1845 |
| 685,473 | Hill | Oct. 29, 1901 |
| 955,235 | Wellman | Apr. 19, 1910 |
| 1,323,020 | Cresmer | Nov. 25, 1919 |
| 1,598,059 | Cykler | Aug. 31, 1926 |
| 2,026,996 | Raflovich | Jan. 8, 1936 |
| 2,346,335 | Sidnell | Apr. 11, 1944 |
| 2,403,780 | Barbieri | July 9, 1946 |